Oct. 13, 1970

F. K. McTAGGART 3,533,777

PRODUCTION OF METALS FROM THEIR HALIDES

Filed Nov. 8, 1966

United States Patent Office 3,533,777
Patented Oct. 13, 1970

3,533,777
PRODUCTION OF METALS FROM THEIR HALIDES
Frederick K. McTaggart, East Hawthorn, Victoria, Australia, assignor to Commonwealth Scientific and Industrial Research Organization, East Melbourne, Victoria, Australia, a body corporate
Filed Nov. 2, 1966, Ser. No. 591,571
Claims priority, application Australia, Nov. 2, 1965, 66,043/65
Int. Cl. C22d 7/00; B23k 13/00
U.S. Cl. 75—10
22 Claims

ABSTRACT OF THE DISCLOSURE

A process for producing metals from the halides of metals of Groups I, II, III and rare earth metals comprising generating a plasma, preferably by utilizing high frequency electromagnetic energy within a gas or a vapor of said halide to cause the halide to dissociate, and then separate the metal thus produced from the other dissociation products. An auxiliary gas may also be used in conjunction with the halide.

---

This invention is concerned with a novel technique for the production of metals and is particularly, but not exclusively, suitable for the production of the metals of Groups I, II and III of the Periodic Table. Although the technique of the invention is thought to have immediate application in the winning and production of the rarer metals (including the rare earth metals) in high purity, its application to the winning, production or refining of more common metals such as aluminium is also envisaged.

Basically, the invention involves the generation of a plasma within the gaseous halide of the metal concerned to reduce the halide to the halogen and the metal. The process appears at least in some cases to involve energetic electrons in the plasma which break the metal-halogen bonds to produce the free metal. It has been found that the halides of Group I and III metals can be reduced directly to the metals in the plasma and that the halides of Group II appear to be reduced to unstable monohalides which rapidly disproportionate to give equimolar proportions of metals plus dihalide.

An auxilary gas may be used in conjunction with the halide to assist in conveying the halide through the plasma, for ease in initiating and maintaining the plasma, or for otherwise effectively increasing the yield. Hydrogen, for example, is very suitable for use as an auxiliary gas, although the Group I and Group II halides reduce equally well in nitrogen or an inert gas such as helium. In the case of Group III halides, however, the use of hydrogen markedly increases the yield—probably due to its scavenging action on the large amount of halogen produced, thereby minimizing back reaction. When using inert gases or nitrogen, the halogen evolved may be trapped out, while, when using hydrogen, the hydrochloric or other acid produced may be trapped out or absorbed.

Techniques of initiating and maintaining plasma discharges in gases are well known and many of these techniques are suitable for use in this invention. While it is possible to reduce a gaseous metal halide by subjecting it to electron bombardment in an electrode-initiated discharge or in other forms of plasma, the preferred method of plasma generation is that where the gas is subjected to a high frequency electromagnetic field without electrodes. The frequencies particularly envisaged are those in the range 0.5 to 10 gc./s. because, at these frequencies, relatively high coupling of energy into the gas or vapour can be achieved. Some lithium, beryllium and boron halides reduce in lower frequency plasmas such as those generated at 2–50 mc./s. In general, however, the reduction requires the use of higher frequencies such as in the range of 1–3 gc./s.

Other considerations which are familiar to those skilled in microwave techniques must also be borne in mind when selecting the operating frequency and other equipment parameters. For example, if the plasma is to be generated within a resonant cavity or a section of waveguide through which the halide gas or vapour is to pass, the use of frequencies at the upper end of the range quoted may well result in the constriction of gas flow owing to the small passage dimensions required in order to obtain electric fields of high intensity. Again, it has been found that a satisfactory compromise for small scale equipment appears to be obtained by the use of frequencies within the range 1–3 gc./s. However, the prime consideration will be, of course, the generation of an energetic plasma and, for this reason, known plasma systems can be employed and modified in order to handle the flow of the halide and the products of the reaction. This will normally necessitate a relatively low operating pressure—usually between 1.0 and 100 torr—although much higher pressures are possible where hydrogen is used as an auxiliary gas. Where the plasma is produced in a "jet" or "torch" by known means, the pressures involved can range from sub-to super-atmospheric.

In order to further portray the main features of the invention, various embodiments thereof will now be particularly described by way of illustration and example. The embodiments will be described by reference to the accompanying drawings, in which.

Figure 1:
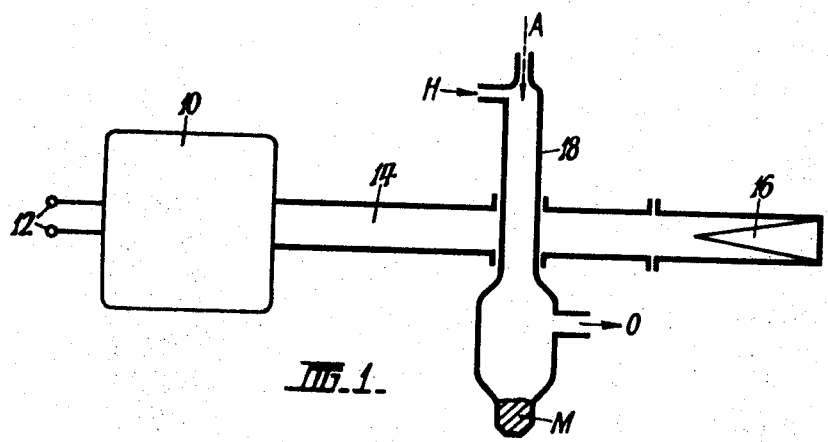
FIG. 1 is a diagrammatic section of a simple device for producing metals from their halides in accordance with the invention. It can be regarded as either a plan or an elevation of the apparatus.

Referring now to FIG. 1 of the drawings, the basic form of the apparatus simply comprises a magnetron or other power generator 10 of microwaves which can be connected by terminals 12 to the electrical power supply. The output of magnetron 10 is delivered into a waveguide 14 of rectangular cross-section which is provided with a proper terminating impedance or tuning stub 16. A silica plasma tube 18 is inserted transversely through the waveguide 14 at a point of maximum electrical field intensity.

In operation, the metal halide is fed into the silica tube at H and the auxiliary gas, if any, is added at the same point or by way of the separate inlet A. Any unreacted gases together with any gaseous products or intermediates are removed from the outlet O, while the metal is collected in the closed portion M of the tube 18. There is a tendency for the metal to deposit on the walls of the tube within the waveguide and to thereby shield the interior of the tube from the microwave energy. This can be largely avoided by mounting tube 18 vertically and sweeping the gas downwardly through the tube fairly rapidly. Deposit of metal on the tube walls below, or outside, the waveguide does not appear to affect the plasma significantly and, for low melting point metals, the tube may be heated so as to allow the metal to run down to a collection point. On the other hand, the use of suitable flow conditions within a fairly large diameter tube will allow the metal to solidify into small particles and fall to the bottom of the collection area M. Finally, if desired, the unreacted halide and any gaseous products can be readily separated from one another and from the auxiliary gas by suitable cold traps or the like as is well known in the manufacture of chemicals.

With the basic apparatus of FIG. 1 in a laboratory trial and employing a magnetron having an output of 2.45 gc./s. and a system pressure of about 1.5 torr, about 46% of the metal in a sample of aluminium chloride ($AlCl_3$) was recovered after a single pass when employing hydrogen as the auxiliary gas. The aluminium chloride vapour was generated by heating a quantity of the solid so as to produce the desired pressure and flow rates in conjunction with a suitable vacuum pump (not shown) connected to the outlet O. In order to separate the various output gases, it is convenient to maintain the metal collecting portion above 200° C. to prevent the unreacted chloride from condensing there and to employ a first trap at about ambient temperature to retain the chloride and at least one or two cold traps to condense out the chlorine gas and the hydrogen chloride. It was found that attempts to reduce aluminium chloride without the use of hydrogen were not so successful, less than 20% of the metal being recovered after one pass.

Somewhat similar results have been obtained with other metal chlorides and form a useful comparison here. With beryllium chloride ($BeCl_2$) and hydrogen at a pressure of 2 torr, about 15% of the available metal was reduced in a single pass through the tube. Again, with lithium chloride (LiCl) the auxiliary gas used was helium and the pressure employed was 1.5 torr, and some 60% of the possible lithium was deposited after a single pass. In both the above described examples, essentially the same apparatus was used as that described in respect of aluminium chloride. However, it will be appreciated that the use of tube 18 could be avoided if part of the waveguide 14 were itself to be used to convey the gases. In such a case, deposition of metal on the walls of the waveguide, though not shielding the gas, may be glossy and result in detuning of the system, and steps could be taken to ensure that deposits are formed outside the waveguide section itself.

Figure 2:
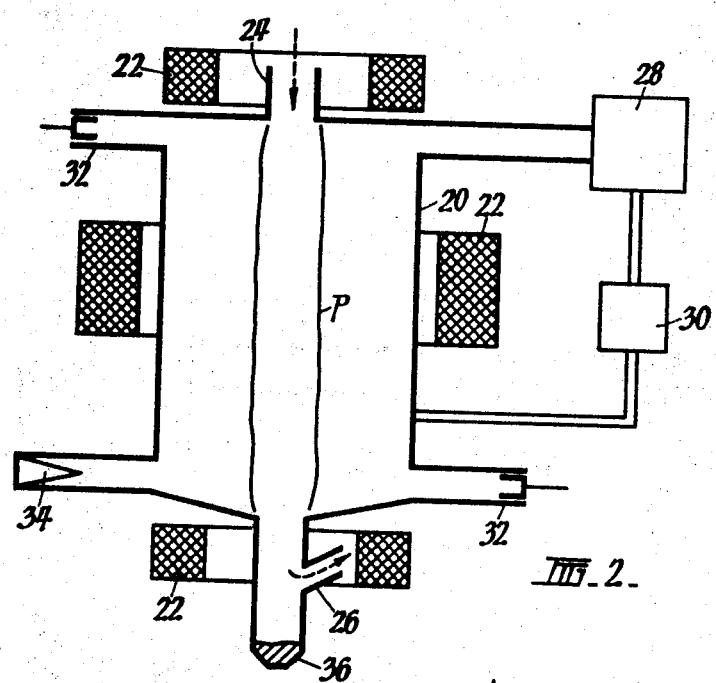
FIG. 2 is a diagrammatic sectional elevation of one known form of magnetically constricted plasma generator modified to suit the process of the present invention.

FIG. 2 of the drawings shows a form of plasma generator which has been used elsewhere, but which can be readily adapted for the purposes of the present invention. In this case, a coaxial line resonator or cavity is formed by a metal chamber 20 which, because of the low impedance, can be of between one and two feet in diameter, the frequency employed again being about 1–4 gc./s. In this case, however, the plasma is constrained by "pinch coils" 22 so that it stays within the centre of the chamber 20 and in line with the gas inlet 24 and outlet 26. The microwave power is obtained from a power klystron 28 that can be controlled in frequency to retain the tuning of the chamber or cavity, automatic tuning being effected by a feed-back control loop 30 and preset or manual tuning being obtained by the conventional tuning stubs 32. The high frequency energy is passed down the central plasma column P and into the terminating waveguide 34. Finally, the particulate metal can be recovered simply from the hopper 36 as the diameter of the chamber is such that it is possible to ensure that the metal solidifies in the annular region between the plasma and the walls.

Figure 3:
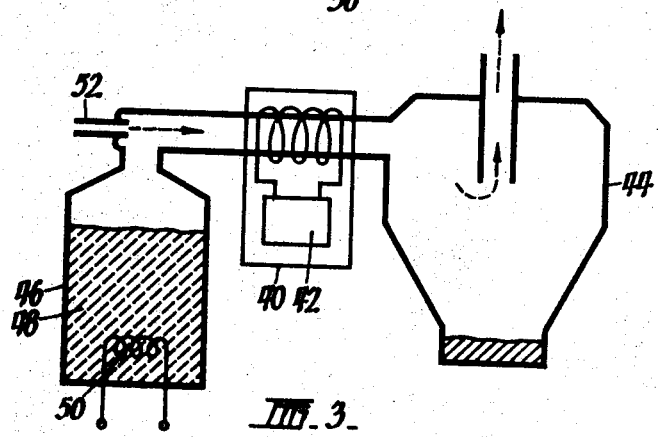
FIG. 3 is a diagrammatic sectional elevation of another form of apparatus for the performance of the invention and employing a plasma jet or torch.

In FIG. 3 of the drawings, the halide vapour or gas is fed to a conventional plasma jet 40 driven by high frequency power supply 42. The gases discharged from the plasma enter into a collection chamber 44 which is maintained at a suitable pressure to ensure proper operation of the plasma jet 40 and at a suitable temperature to allow the desired metal to precipitate out of the gases and fall to the bottom of chamber 44 as a rain of fine droplets or particles. This figure also shows a retort 46 wherein the solid metal halide 48 is heated by coil 50 to generate the vapour which is combined with the auxiliary gas from inlet 52 to feed the plasma jet. Thus, where aluminium is to be produced, the chloride can readily be obtained from the chlorination of bauxite and, as it vapourizes at about 200° C., large quantities of the halide vapour can be readily treated according to this and other forms of the invention for the production of aluminium metal.

It will be appreciated from the foregoing that the invention can be applied by many forms of known high frequency apparatus and is not strictly limited to any of the forms described. Thus, such apparatus may be combined or modified to suit particular conditions or to obtain more thorough procuring of the halide by passing it through successive stages. It should be noted also that the present invention is not solely confined to metal-winning, but may have application as a technique for depositing metal films.

It is also to be understood that the invention is not to be restricted to the metals and halides specifically referred to in the above examples. The work of the applicant indicates that the technique is applicable to the fluorides, chlorides, bromides and iodides of a surprisingly wide range of metals. In particular, despite the tendency for recovery of metal to decrease with increasing molecular weight and increasing melting point of the metal halide, the technique has been found to be applicable to the metals of Groups I, II and III and to the rare earth metals.

In this specification the term "plasma" has been used simply to indicate any body of vapour or gas which is substantially ionized. Usually, but not essentially, the plasma may emit radiation in the visible spectrum and can thus be easily identified.

I claim:

1. A method of producing a metal from a halide thereof which comprises generating a plasma within a gas or vapour of said halide thereby to dissociate the halide and separating the metal thus produced from the other dissociation products and any undissociated halide, wherein said plasma is generated by means of a high frequency electromagnetic field.

2. The method of claim 1, wherein said plasma is maintained by the introduction of a stream of said halide in a gaseous state into said plasma, and wherein said separation is effected by selectively condensing the metal thus produced.

3. A method of producing a metal from a halide thereof which comprises generating a plasma by means of a high frequency electromagnetic field, passing a stream of metal halide in a gaseous or vapour state into said plasma to cause dissociation of the halide, removing the dissociation products from the plasma and selectively condensing the metal from said products.

4. A method according to claim 2, wherein the metal halide is introduced into the plasma with an auxiliary gas by which the initiation and maintenance of the plasma is facilitated.

5. A method according to claim 3, wherein the metal halide is introduced into the plasma with an auxiliary gas by which the initiation and maintenance of the plasma is facilitated.

6. A method according to claim 2, wherein the metal halide is introduced into the plasma with an auxiliary gas which reacts with the halogen formed as a dissociation product within the plasma to reduce back-reaction of the metal within said halogen.

7. A method according to claim 3, wherein the metal halide is introduced into the plasma with an auxiliary gas which reacts with the halogen formed as a dissociation product within the plasma to reduce back-reaction of the metal with said halogen.

8. A method according to claim 3, wherein the stream of halide is directed along or through a waveguide and the plasma is generated within the vapour or gas stream by directing high frequency electromagnetic energy into said waveguide.

9. A method according to claim 3, wherein the stream of halide is directed into or through a resonant cavity and the plasma is generated within the vapour or gas stream by directing high frequency electromagnetic energy into said cavity.

10. A method according to claim 9, wherein the plasma is magnetically constricted in said cavity.

11. A method according to claim 2, wherein the stream of metal halide is passed through a plasma torch or jet which discharges into a collection vessel.

12. A method according to claim 3, wherein the stream of metal halide is passed through a plasma torch or jet which discharges into a collection vessel.

13. The method of claim 1, wherein said plasma is generated in a frequency range of from 1 to 3 gc./s., and the pressure of operation is between 1.0 and 100 torr.

14. The method of claim 3, wherein said plasma is generated in a frequency range of from 1 to 3 gc./s., and the pressure of operation is between 1.0 and 100 torr.

15. The method of claim 1, wherein said metal halide is selected from the group consisting of halides of metals of Groups I, II, and III, and rare earth metals.

16. The method of claim 3, wherein said metal halide is selected from the group consisting of halides of metals of Groups I, II, and III, and rare earth metals.

17. The method of claim 15, wherein said halide is a metal chloride.

18. The method of claim 16, wherein said halide is a metal chloride.

19. The method of claim 17, wherein said metal chloride is selected from the group consisting of chlorides of aluminum, beryllium, and lithium.

20. The method of claim 18, wherein said metal chloride is selected from the group consisting of chlorides of aluminum, beryllium, and lithium.

21. The method of claim 19, wherein said chloride is aluminum chloride.

22. The method of claim 20, wherein said chloride is aluminum chloride.

References Cited

UNITED STATES PATENTS

| | | | |
|---|---|---|---|
| 3,264,508 | 8/1966 | Lai | 219—121 X |
| 3,347,698 | 10/1967 | Ingham | 219—121 X |
| 3,429,691 | 2/1969 | McLaughlin | 75—10 |
| 3,475,158 | 10/1969 | Neuenschwander | 75—.5 |
| 3,390,980 | 7/1968 | Orbach | 75—84.5 |
| 2,768,074 | 10/1956 | Stauffer | 75—10 |
| 3,211,548 | 10/1965 | Scheller | 75—84 |
| 3,341,320 | 9/1967 | Smiley | 75—.5 |

OTHER REFERENCES

Vitro Corp of America and Sheer-Korman Assc., The High Intensity Electric Arc and Its Application to Process Chemistry, N.Y., May 25, 1956, pp. 1–24.

L. DEWAYNE RUTLEDGE, Primary Examiner

J. E. LEGRU, Assistant Examiner

U.S. Cl. X.R.

117—105, 105.2, 107.2; 219—10.53